US 8,788,579 B2

(12) United States Patent
Kruse et al.

(10) Patent No.: US 8,788,579 B2
(45) Date of Patent: Jul. 22, 2014

(54) CLUSTERED CLIENT FAILOVER

(75) Inventors: David M. Kruse, Kirkland, WA (US); Diaa Fathalla, Redmond, WA (US); James T. Pinkerton, Sammamish, WA (US); Mathew George, Bellevue, WA (US); Prashanth Prahalad, Bellevue, WA (US); Thomas E. Jolly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 59 days.

(21) Appl. No.: 13/228,732

(22) Filed: Sep. 9, 2011

(65) Prior Publication Data

US 2013/0066941 A1 Mar. 14, 2013

(51) Int. Cl.
*G06F 15/16* (2006.01)

(52) U.S. Cl.
USPC ........... 709/203; 709/223; 709/230; 709/231; 709/232; 709/233; 714/2; 714/4; 714/4.11; 714/6.3; 714/6.12; 714/11; 714/16; 714/43

(58) Field of Classification Search
USPC ............ 709/203, 223, 230–233; 714/2, 4, 11, 714/16, 43, 6.3, 6.12
See application file for complete search history.

(56) References Cited

U.S. PATENT DOCUMENTS

| 4,399,504 | A | 8/1983 | Obermarck |
|---|---|---|---|
| 4,780,821 | A | 10/1988 | Crossley |
| 4,791,566 | A | 12/1988 | Sudama |
| 4,825,354 | A | 4/1989 | Agrawal |
| 4,887,204 | A | 12/1989 | Johnson |
| 4,891,785 | A | 1/1990 | Donohoo |
| 4,914,570 | A | 4/1990 | Peacock |
| 5,008,853 | A | 4/1991 | Bly |
| 5,109,519 | A | 4/1992 | Zimmet |

(Continued)

FOREIGN PATENT DOCUMENTS

| EP | 1 259 045 A2 | 11/2002 |
|---|---|---|
| EP | 1 259 045 A3 | 11/2002 |

(Continued)

OTHER PUBLICATIONS

European Exam Report in Application 05111885.9 mailed Sep. 13, 2007, 5 pgs.

(Continued)

*Primary Examiner* — Ario Etienne
*Assistant Examiner* — Kidest Mendaye
(74) *Attorney, Agent, or Firm* — Henry Gabryjelski; Kate Drakos; Micky Minhas

(57) ABSTRACT

An application instance identifier is employed with various systems and methods in order to provide a requestor with continuous access to a resource when operating in a client clustered environment. A requestor residing on a first client may attempt to access a resource. The first client sends a request to access the resource. The request may be associated with an application instance identifier that identifies the requestor. At some point, the first client fails and the requestor is associated with a second client via a failover mechanism. The second client sends a second request to access the resource on behalf of the requestor. The second request is associated with the requestor's application instance identifier. The application instance identifier is used to identify the second request as belonging to the same requestor as the first request, thereby granting the second request to access the resource while avoiding a conflict situation.

20 Claims, 5 Drawing Sheets

(56) References Cited

U.S. PATENT DOCUMENTS

| | | |
|---|---|---|
| 5,113,519 A | 5/1992 | Johnson |
| 5,202,971 A | 4/1993 | Henson |
| 5,218,696 A | 6/1993 | Baird et al. |
| 5,261,051 A | 11/1993 | Masden et al. |
| 5,265,261 A | 11/1993 | Rubin et al. |
| 5,313,646 A | 5/1994 | Hendricks et al. |
| 5,349,642 A | 9/1994 | Kingdon |
| 5,375,207 A | 12/1994 | Blakely et al. |
| 5,410,697 A | 4/1995 | Baird |
| 5,437,013 A | 7/1995 | Rubin et al. |
| 5,452,447 A | 9/1995 | Nelson |
| 5,491,752 A | 2/1996 | Kaufman et al. |
| 5,493,728 A | 2/1996 | Solton |
| 5,513,314 A | 4/1996 | Kandasamy |
| 5,522,042 A | 5/1996 | Fee et al. |
| 5,535,375 A | 7/1996 | Eshel et al. |
| 5,560,008 A | 9/1996 | Johnson et al. |
| 5,588,117 A | 12/1996 | Karp et al. |
| 5,628,005 A | 5/1997 | Hurvig |
| 5,764,887 A | 6/1998 | Kells et al. |
| 5,826,027 A | 10/1998 | Pedersen et al. |
| 5,931,913 A | 8/1999 | Meriwether et al. |
| 5,933,602 A | 8/1999 | Grover |
| 5,978,802 A | 11/1999 | Hurvig |
| 6,085,247 A | 7/2000 | Parsons et al. |
| 6,092,199 A | 7/2000 | Dutcher |
| 6,125,122 A | 9/2000 | Favichia et al. |
| 6,131,125 A | 10/2000 | Rostoker et al. |
| 6,208,952 B1 | 3/2001 | Goertzel |
| 6,219,799 B1 | 4/2001 | Kandasamy |
| 6,243,862 B1 | 6/2001 | Lebow |
| 6,247,139 B1 * | 6/2001 | Walker et al. ............... 714/2 |
| 6,275,953 B1 | 8/2001 | Vahalia et al. |
| 6,317,844 B1 * | 11/2001 | Kleiman ............... 714/6.12 |
| 6,324,581 B1 | 11/2001 | Xu et al. |
| 6,349,250 B1 | 2/2002 | Hart et al. |
| 6,349,350 B1 | 2/2002 | Hathorn et al. |
| 6,401,123 B1 | 6/2002 | Shields et al. |
| 6,430,691 B1 | 8/2002 | Di Santo et al. |
| 6,438,691 B1 | 8/2002 | Mao |
| 6,452,903 B1 | 9/2002 | Peck et al. |
| 6,453,354 B1 | 9/2002 | Jiang et al. |
| 6,640,226 B1 | 10/2003 | Shringeri et al. |
| 6,658,476 B1 | 12/2003 | Van |
| 6,829,473 B2 | 12/2004 | Raman et al. |
| 6,883,015 B1 | 4/2005 | Geen et al. |
| 6,910,082 B1 | 6/2005 | Marcotte |
| 6,928,577 B2 | 8/2005 | Moser et al. |
| 7,020,651 B2 | 3/2006 | Ripley |
| 7,103,007 B2 | 9/2006 | Natarajan et al. |
| 7,111,035 B2 | 9/2006 | McClellan et al. |
| 7,111,060 B2 | 9/2006 | Araujo et al. |
| 7,197,535 B2 | 3/2007 | Salesky et al. |
| 7,243,132 B2 | 7/2007 | Choi |
| 7,290,141 B2 | 10/2007 | Sengodan et al. |
| 7,293,192 B2 * | 11/2007 | Allen et al. ............... 714/6.3 |
| 7,318,102 B1 | 1/2008 | Krause et al. |
| 7,330,910 B2 | 2/2008 | Young et al. |
| 7,339,885 B2 | 3/2008 | Ahrens et al. |
| 7,380,080 B2 | 5/2008 | Hughes |
| 7,380,155 B2 | 5/2008 | Fung et al. |
| 7,383,463 B2 | 6/2008 | Hayden et al. |
| 7,386,889 B2 | 6/2008 | Shay |
| 7,388,866 B2 | 6/2008 | Fan et al. |
| 7,409,420 B2 | 8/2008 | Pullara et al. |
| 7,421,502 B2 | 9/2008 | Czap et al. |
| 7,434,087 B1 | 10/2008 | Singh |
| 7,444,536 B1 | 10/2008 | Jairath |
| 7,451,221 B2 | 11/2008 | Basani et al. |
| 7,453,879 B1 | 11/2008 | Lo |
| 7,457,722 B1 | 11/2008 | Shain et al. |
| 7,509,407 B2 | 3/2009 | Miller et al. |
| 7,526,658 B1 * | 4/2009 | He et al. ............... 713/193 |
| 7,526,668 B2 | 4/2009 | Shitomi et al. |
| 7,539,722 B2 | 5/2009 | Mohamed et al. |
| 7,562,129 B1 | 7/2009 | Lee et al. |
| 7,664,991 B1 * | 2/2010 | Gunda et al. ............... 714/43 |
| 7,673,066 B2 | 3/2010 | Zheng |
| 7,702,745 B2 | 4/2010 | Lin et al. |
| 8,275,815 B2 | 9/2012 | Aronovich et al. |
| 2002/0019874 A1 | 2/2002 | Borr |
| 2002/0073211 A1 | 6/2002 | Lin et al. |
| 2002/0083130 A1 | 6/2002 | Shimada et al. |
| 2002/0152315 A1 | 10/2002 | Kagan et al. |
| 2002/0161980 A1 | 10/2002 | Nishikawa |
| 2003/0018927 A1 | 1/2003 | Gadir et al. |
| 2003/0056069 A1 | 3/2003 | Cabrera et al. |
| 2003/0058277 A1 | 3/2003 | Bowman-Amuah |
| 2003/0093643 A1 | 5/2003 | Britt, Jr. |
| 2003/0093678 A1 | 5/2003 | Bowe et al. |
| 2003/0112754 A1 | 6/2003 | Ramani et al. |
| 2003/0115341 A1 | 6/2003 | Sinha et al. |
| 2003/0126195 A1 | 7/2003 | Reynolds et al. |
| 2003/0140129 A1 | 7/2003 | Livnat et al. |
| 2003/0169859 A1 | 9/2003 | Strathmeyer et al. |
| 2003/0182282 A1 | 9/2003 | Ripley |
| 2004/0003210 A1 | 1/2004 | Duale et al. |
| 2004/0003241 A1 | 1/2004 | Sengodan et al. |
| 2004/0018829 A1 | 1/2004 | Raman et al. |
| 2004/0019660 A1 * | 1/2004 | E. et al. ............... 709/219 |
| 2004/0032876 A1 | 2/2004 | Garg et al. |
| 2004/0044930 A1 | 3/2004 | Keller et al. |
| 2004/0103342 A1 | 5/2004 | Moser et al. |
| 2004/0136325 A1 | 7/2004 | Dobric et al. |
| 2004/0160909 A1 | 8/2004 | Sheynblat |
| 2004/0215794 A1 | 10/2004 | Lauer |
| 2004/0225952 A1 | 11/2004 | Brown et al. |
| 2004/0260748 A1 | 12/2004 | Springer et al. |
| 2004/0267932 A1 | 12/2004 | Voellm et al. |
| 2004/0268118 A1 | 12/2004 | Bazran Bejarano |
| 2005/0010670 A1 | 1/2005 | Greschler et al. |
| 2005/0015511 A1 | 1/2005 | Izmailov et al. |
| 2005/0015747 A1 | 1/2005 | Zatloukal et al. |
| 2005/0021832 A1 | 1/2005 | Bennett et al. |
| 2005/0038828 A1 | 2/2005 | Kaluskar et al. |
| 2005/0041686 A1 | 2/2005 | Roy et al. |
| 2005/0055345 A1 | 3/2005 | Ripley |
| 2005/0060442 A1 | 3/2005 | Beverly et al. |
| 2005/0091212 A1 * | 4/2005 | Mohamed et al. ............... 707/9 |
| 2005/0102537 A1 | 5/2005 | Zheng |
| 2005/0111030 A1 | 5/2005 | Berkema et al. |
| 2005/0114670 A1 | 5/2005 | Bowe et al. |
| 2005/0125378 A1 | 6/2005 | Kawada |
| 2005/0129045 A1 | 6/2005 | Machulsky et al. |
| 2005/0131832 A1 | 6/2005 | Fransdonk |
| 2005/0132077 A1 | 6/2005 | Biran et al. |
| 2005/0138528 A1 | 6/2005 | Ameigeiras et al. |
| 2005/0149817 A1 | 7/2005 | Biran et al. |
| 2005/0177635 A1 | 8/2005 | Schmidt et al. |
| 2005/0182850 A1 | 8/2005 | Kohno |
| 2005/0198113 A1 | 9/2005 | Mohamed et al. |
| 2005/0198247 A1 | 9/2005 | Perry et al. |
| 2005/0198359 A1 | 9/2005 | Basani et al. |
| 2005/0198380 A1 | 9/2005 | Panasyuk et al. |
| 2005/0223014 A1 * | 10/2005 | Sharma et al. ............... 707/10 |
| 2005/0228884 A1 | 10/2005 | Hawley |
| 2005/0246803 A1 | 11/2005 | Spencer |
| 2005/0248803 A1 | 11/2005 | Ohara |
| 2005/0251448 A1 | 11/2005 | Gropper |
| 2005/0257022 A1 | 11/2005 | Hughes |
| 2005/0258022 A1 | 11/2005 | Horton et al. |
| 2005/0262084 A1 | 11/2005 | Tomita |
| 2005/0262103 A1 | 11/2005 | Stakutis et al. |
| 2006/0031519 A1 | 2/2006 | Helliwell et al. |
| 2006/0041698 A1 | 2/2006 | Han et al. |
| 2006/0045005 A1 | 3/2006 | Blackmore et al. |
| 2006/0047818 A1 | 3/2006 | Kruglick et al. |
| 2006/0059118 A1 * | 3/2006 | Byrd et al. ............... 707/3 |
| 2006/0080443 A1 | 4/2006 | Kruglick et al. |
| 2006/0080568 A1 | 4/2006 | Subbaraman et al. |
| 2006/0085328 A1 | 4/2006 | Cohen et al. |
| 2006/0095382 A1 | 5/2006 | Mahlbacher |
| 2006/0130107 A1 | 6/2006 | Gonder et al. |
| 2006/0168262 A1 | 7/2006 | Frazer |

(56) References Cited

U.S. PATENT DOCUMENTS

| | | |
|---|---|---|
| 2006/0206705 A1 | 9/2006 | Khosravi |
| 2006/0271679 A1 | 11/2006 | Mousseau et al. |
| 2006/0271692 A1 | 11/2006 | Kruse et al. |
| 2006/0271697 A1 | 11/2006 | Kruse et al. |
| 2006/0281525 A1 | 12/2006 | Borissov |
| 2007/0150558 A1 | 6/2007 | Teodosiu et al. |
| 2007/0171793 A1 | 7/2007 | Mesut et al. |
| 2007/0192326 A1 | 8/2007 | Angal et al. |
| 2007/0220155 A1 | 9/2007 | Nalla et al. |
| 2008/0151885 A1 | 6/2008 | Horn et al. |
| 2008/0172397 A1 | 7/2008 | Maeda et al. |
| 2009/0077097 A1 | 3/2009 | Lacapra et al. |
| 2009/0138615 A1 | 5/2009 | Cristallo et al. |
| 2009/0172085 A1 | 7/2009 | Arthursson |
| 2009/0222582 A1 | 9/2009 | Josefsberg et al. |
| 2009/0319661 A1 | 12/2009 | Shiozawa et al. |
| 2009/0327798 A1 | 12/2009 | D'Amato et al. |
| 2010/0042715 A1 | 2/2010 | Tham et al. |
| 2010/0161855 A1 | 6/2010 | Mohamed et al. |
| 2010/0185704 A1 | 7/2010 | George et al. |
| 2011/0040826 A1 | 2/2011 | Chadzelek et al. |
| 2012/0151249 A1 | 6/2012 | Swan et al. |
| 2013/0304932 A1 | 11/2012 | Kruse et al. |
| 2013/0007180 A1 | 1/2013 | Talpey et al. |
| 2013/0007518 A1 | 1/2013 | George et al. |
| 2013/0067095 A1 | 3/2013 | Kruse et al. |
| 2013/0091199 A1 | 4/2013 | Kruse et al. |
| 2013/0097211 A1 | 4/2013 | Kruse et al. |

FOREIGN PATENT DOCUMENTS

| | | |
|---|---|---|
| EP | 1 727 056 | 11/2006 |
| JP | 60-019341 | 1/1985 |
| JP | 62-297927 | 12/1987 |
| JP | 63-061148 | 3/1988 |
| JP | 63-205747 | 8/1988 |
| JP | 64-061148 | 3/1989 |
| JP | 02-101847 | 4/1990 |
| JP | 03-048558 | 3/1991 |
| JP | 03-074745 | 3/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | 63-256165 | 10/1998 |
| JP | 10-313342 | 11/1998 |
| JP | 11-055314 | 2/1999 |
| JP | 2001-094613 | 4/2001 |
| JP | 2003-016766 | 1/2003 |
| JP | 2003-069610 | 3/2003 |
| JP | 2003-281091 | 3/2003 |
| JP | 2003-125022 | 4/2003 |
| JP | 2004-005427 | 1/2004 |
| JP | 2004-229143 | 8/2004 |
| JP | 2005-322016 | 11/2005 |
| JP | 2007-49755 | 2/2007 |
| JP | 3967758 | 6/2007 |
| KR | 10-1994-0001700 | 3/1994 |
| KR | 10-0860152 | 9/2008 |
| WO | WO 03/096646 | 11/2003 |

OTHER PUBLICATIONS

European Invitation to Correct Defects in Application No. 08008916.2 mailed Sep. 4, 2008, 6 pgs.
European Notice of Allowance in Application 05111885.9 mailed Jun. 11, 2008, 6 pgs.
European Notice of Allowance in Application 080089162 mailed Jan. 24, 2011, 6 pgs.
European Notice to Grant in Application 05111885.9 mailed Oct. 9, 2008, 1 page.
Hong Kong Certificate of Grant in Application 07105689.8 mailed Jun. 26, 2009, 2 pgs.
Japanese Office Action in Application 200510127997.8 mailed Aug. 3, 2011, 8 pgs.
Japanese Office Notice of Rejection in Application 2006-307121 mailed Aug. 12, 2011, 5 pgs.
U.S. Appl. No. 11/182,251, Amendment and Response filed Nov. 26, 2008, 12 pgs.
U.S. Appl. No. 11/182,251, Amendment and Response filed Nov. 30, 2010, 17 pgs.
U.S. Appl. No. 11/182,251, Amendment and Response filed Apr. 26, 2010, 17 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Office Action mailed Nov. 6, 2008, 4 pgs.
U.S. Appl. No. 11/182,251, Office Action mailed Aug. 22, 2008, 7 pgs.
U.S. Appl. No. 11/182,251, Office Action mailed Aug. 4, 2011, 23 pgs.
U.S. Appl. No. 11/182,989, Amendment and Response mailed Oct. 19, 2009, 6 pgs.
U.S. Appl. No. 11/182,989, Amendment and Response mailed Oct. 29, 2010, 14 pgs.
U.S. Appl. No. 11/182,989, Amendment and Response mailed Nov. 26, 2008, 12 pgs.
U.S. Appl. No. 11/182,989, Amendment and Response mailed May 3, 2010, 14 pgs.
U.S. Appl. No. 11/182,989, Amendment and Response mailed Aug. 14, 2009, 11 pgs.
U.S. Appl. No. 11/182,989, Office Action mailed Sep. 1, 2011, 19 pgs.
U.S. Appl. No. 11/182,989, Office Action mailed Sep. 5, 2008, 6 pgs.
Microsoft Computer Dictionary, Microsoft Press, Fifth Edition, 2002, p. 486.
U.S. Appl. No. 11/182,251, Amendment and Response filed Oct. 11, 2012, 2 pgs.
U.S. Appl. No. 12/964,749, Office Action mailed Jan. 29, 2013, 17 pgs.
U.S. Appl. No. 13/663,827, Office Action mailed Jan. 29, 2013, 16 pgs.
U.S. Appl. No. 13/664,012, Office Action mailed Jan. 25, 2013, 19 pgs.
Chinese 4th Office Action in Application 200510127998.2, mailed Nov. 16, 2011, 7 pgs.
Chinese 5th Office Action in Application 200510127998.2, mailed Mar. 2, 2012, 8 pgs.
Chinese Notice of Allowance in Application 2005101279978.2, mailed Dec. 5, 2011, 4 pgs.
Japanese Office Notice of Allowance in Application 2006-307121 mailed Feb. 14, 2012, 6 pgs.
Maiworm, Daniel, "Symantec Enterprise Vault", Retrieved at http://www.cstl.com/products/Symantec/Symantec-Enterprise_Vault/File System Archiving.pdf, Feb. 5, 2007, pp. 35.
NTFS Design Goals and Features, Retrieved at http://wininternals.uw.hu/ch12lev1sec4.html, Retrieved Date: Oct. 11, 2010, pp. 9.
Oehme, et al.,"IBM Scale out File Services: Reinventing network-attached storage", Retrieved at http://www-935.ibm.com/services/us/its/pdf/sofs-am-journal-final-07010B.pdf, vol. 52 No. 4/5 Jul./Sep. 200B, 10 Pages.
U.S. Appl. No. 11/182,251, Amendment and Response filed Nov. 4, 2011, 17 pgs.
U.S. Appl. No. 11/182,251, Office Action mailed Jan. 30, 2012, 24 pgs.
U.S. Appl. No. 11/182,989, Amendment and Response filed Dec. 1, 2011, 13 pgs.
U.S. Appl. No. 11/182,989, Office Action mailed Feb. 28, 2012, 20 pgs.
Chinese Notice of Entering into Substantive Examination in Application 201210331041.X, mailed Mar. 6, 2013, 3 pgs.
Indian First Exam Report in Application 3305/DEL/2005, mailed Mar. 28, 2013, 2 pgs.

(56) References Cited

OTHER PUBLICATIONS

PCT International Search Report and Written Opinion in International Application PCT/US2012/041049, mailed Jan. 17, 2013, 12 pgs.
PCT International Search Report and Written Opinion in International Application PCT/US2012/054038, mailed Feb. 20, 2013, 10 pgs.
PCT International Search Report and Written Opinion in International Application PCT/US2012/041703, mailed Feb. 14, 2013, 13 pgs.
PCT International Search Report and Written Opinion in International Application PCT/US2012/054039, mailed Feb. 27, 2013, 11 pgs.
U.S. Appl. No. 12/964,749, Amendment and Response filed Apr. 29, 2013, 9 pgs.
U.S. Appl. No. 13/172,757, Office Action mailed Apr. 19, 2013, 23 pgs.
U.S. Appl. No. 13/663,827, Amendment and Response filed Apr. 29, 2013, 10 pgs.
U.S. Appl. No. 13/664,012, Amendment and Response filed Apr. 24, 2013, 10 pgs.
U.S. Appl. No. 13/664,012, Office Action mailed Apr. 30, 2013, 16 pgs.
U.S. Appl. No. 13/663,827, Office Action mailed May 7, 2013, 16 pgs.
U.S. Appl. No. 11/182,251, Amendment and Response filed May 30, 2012, 14 pgs.
U.S. Appl. No. 11/182,251, Notice of Allowance mailed Jul. 12, 2012, 8 pgs.
U.S. Appl. No. 11/182,989, Amendment and Response mailed May 29, 2012, 11 pgs.
U.S. Appl. No. 11/182,989, Notice of Allowance mailed Jun. 21, 2012, 5 pgs.
PCT International Search Report and Written Opinion in International Application PCT/US2011/063618, mailed Jun. 28, 2012, 9 pgs.
Chinese Notice of Allowance in Application 2005101279982, mailed Aug. 20, 2012, 4 pgs.
Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.
Almeida, "FIFS: A Framework for Implementing User-Mode File Systems in Windows NT", Proceedings of the 3rd USENIX Windows NT Symposium, Jul. 12-15, 1999, 19 pgs.
Alvisi et al., "Low-Overhead Protocols for Fault-Tolerant File Sharing"; In Proceedings of the IEEE 18th International Conference on Distributed Computing Systems; 1998; 10 pgs.
ANSI, Financial Institution Message Authentication (Wholesale), Financial Services Technical Publication, ANSI X9.9-1994, Aug. 15, 1986; 38 pgs.
Asokan et al., Server Supported Signatures, Journal of Computer Security, Fall 1997; 13 pgs.
Bell Labs, Plan 9 default Fossil File System [online], [Retrieved Sep. 17, 2007], Retrieved from: http://plan9.bell-labs.com/magic/man2html/4/fossil; 4 pgs.
Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.
Chinese Office Action dated Apr. 29, 2010 in Application No. 200510127997.8.
Chinese Office Action dated Apr. 29, 2010 in Application No. 200510127998.2.
Chinese Second Office Action dated Mar. 3, 2011 in Application No. 200510127998.2.
Chinese Second Office Action dated Mar. 30, 2011 in Application No. 200510127997.8.
Chinese Third Office Action dated Jul. 7, 2011 in Application No. 200510127998.2.
CIFS http://msdn.microsoft.com/library/default.asp?url= /library/en-us/cifs/protocol/cifs.asp, 2 pgs.

CIFS Oplock File Locking, MSDN, [Retrieved Jan. 7, 2008], Retrieved from: http://msdn2.microsoft.com/en-us/library/aa302210.aspx; 3 pgs.
CIFS or Public SMB Information on Common Internet File System http://support.microsoft.com/default.aspx?scid=kb;en-us;199072; 2 pgs.
Dehaese, G., *The ISO 9660 File System* [online], May 1995, [Retrieved Sep. 14, 2007], Retrieved from: http://users.pandora.be/it3.consultants.bvba/handouts/ISO9960.html.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.
Digital Equipment Corporation, *RSX-11M/M-Plus RMS-11 User's Guide* [online], Order No. AA-L669A-TC, Apr. 1983, [Retrieved Aug. 17, 2007], Retrieved from: http://www.computer.museum.uq.edu.au/RSX-11%20Manuals.html; 186 pgs.
ECMA, Volume and File Structure for Write-Once and Rewritable Media using Non-Sequential Recording for Information Interchange 3rd Edition [online], ECMA-167, Jun. 1997, [Retrieved Aug. 9, 2007, Retrieved from: http://www.ecma-international.org/publications/files/ECMA-ST/Ecma-167.pdf; 150 pgs.
European Search Report dated Feb. 1, 2011 in Application No. 10013021.0.
European Search Report dated Feb. 15, 2006 in Application No. 05111729.9.
European Search Report dated Feb. 22, 2006 in Application No. 05111729.9.
European Search Report dated Jan. 20, 2006 in Application No. RS113279/US18298905.
European Search Report dated Jan. 20, 2006 in Application No. RS113280/US18225105.
European Search Report dated Jan. 4, 2011 in Application No. 10012923-8.
European Search Report dated Jun. 18, 2008 in Application No. 08008916.2.
European Search Report dated Sep. 19, 2006 in Application No. 055111885.9.
French, Steven M., "A New Network File System is Born: Comparison of SMB2, CIFS, and NFS", retrieved Mar. 23, 2011, 14 pgs.
Gifford et al., *The Cedar File System*, Communications of the ACM, vol. 31, No. 3, Mar. 1998; 11 pgs.
Greenberg et al., "NFILE—A File Access Protocol"; Network Working Group; RFC 1037; Dec. 1997; 43 pgs.
Gu et al., "SABUL: A High Performance Data Transfer Protocol"; IEEE Communications Letters; 2001; 11 pgs.
Hartman; "The Zebra Striped Network File System"; Doctoral dissertation at the University of California at Berkeley; 1991; 159 pgs.
Hertel, Implementing CIFS The Common Internet File System [online], [Retrieved Jul. 13, 2007], Retrieved from: http://ubiqx.org/cifs/; 3 pgs.
Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.
Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.
Hobbit, CIFS: Common Insecurities Fail Scrutiny [online], Avian Research, Jan. 1997, Retrieved from: http://web.textfiles.com/hacking/cifs.txt; 39 pgs.
IBM, IBM Personal Computer Seminar Proceedings, vol. 2, No. 5, Sep. 1984; 13 pgs.
International Organization for Standardization, Banking—Approved algorithms for message authentication—, ISO 8731-1, Jun. 1, 1987; 4 pgs.
Internet Assigned Numbers Authority, Well-Known Port Numbers, http://www.jana.org/assignments/port-numbers, 233 pgs.
Japanese Office Notice of Rejection mailed Apr. 3, 2007 in Application No. 2005-356145.
Japanese Office Notice of Rejection mailed Jan. 15, 2008 in Application No. 2005-356145.

(56) References Cited

OTHER PUBLICATIONS

Japanese Office Notice of Rejection mailed Mar. 10, 2006 in Application No. 2005-356146.
Japanese Office Notice of Rejection mailed May 12, 2006 in Application No. 2005-356145.
Japanese Office Notice of Rejection mailed Nov. 10, 2006 in Application No. 2005-356146.
John H. Samba Team Terpstra, "Chapter 32. High Availability Part III. Advanced Configuration", retrieved Mar. 22, 2011, 6 pages.
Kent et al., IP Authentication Header [online], RFC 2402, Nov. 1998, [Retrieved Aug. 9, 2007], Retrieved from: http://tools.ietf.org/html/rfc2402, 20 pgs.
Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.
Klima, "Tunnels in Hash Functions: MD5 Collisions Within a Minute", Version 1, Mar. 2006, Versoin Apr. 2, 2006, Cryptology ePrint Archive, 17 pgs.
Korean Notice of Preliminary Rejection mailed Jan. 21, 2011, Application No. 10-2007-80691.
Korean Notice of Rejection mailed Nov. 17, 2006 in Application No. 10-2005-0124340.
Krawczyk, "HMAC: Keyed-Hashing for Message Authentication", RFC-2104, Feb. 1997, http://www.jetf.org/rfc/rfc2104.txt, 10 pgs.
Leach et al., CIFS Logon and Pass Through Authentication Preliminary Draft [online], Jan. 3, 1997, 22 pgs.
Leach et al., CIFS/E Browser Protocol Preliminary Draft [online], Jan. 10, 1997, 33 pgs.
Leach et al., draft-leach-cifs-print-spec-00.txt, CFIS Printing Specification Preliminary Draft [online], Jan. 31, 1997; 30 pgs.
Leach et al., draft-leach-cifs-rap-spec-00.txt, CFIS Remote Administration Protocol Preliminary Draft [online], Feb. 26, 1997; 39 pgs.
Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS; 160 pgs.
Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.
LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.
Linn, "Generic Security Service Application Program Interface, Version 2, Update 1", RFC 2743, Jan. 2000, http://www.ieft.org/rfc/rfc2743.txt, 90 pgs.
Loafman, Zach, "SMB1/SMB2; A BSD Perspective", retrieved Mar. 22, 2011, 35 pgs.
Morris, "Andrew: A Distributed Personal Computing Environment", Communications of the ACM, vol. 29, No. 3, Mar. 1986, New York, 20 pgs.
MS-SMB2 -Preview: Server Message Block (SMB) Version 2 Protocol Specification, copyright 2010 Microsoft Corporation, 309 pgs.
Mullender, "A Distributed File Service Based on Optimistic Concurrency Control", Proceedings of the Tenth ACM Symposium on Operating Systems Principles, Dec. 1-4, 1985, Orcas Island, WA, 14 pgs.
Murphy, Origins and Development of TOPS-20 [online], © 1989, 1996, [Retrieved Aug. 9, 2007], Retrieved from: http://www.opost.com/dlm/tenex/hbook.html; 28 pgs.
National Bureau of Standards, *Computer Data Authentication*, Federal Information Processing Standards Publication 113, May 30, 1985; 9 pgs.
Pawlowski, Brian et al. "The NFS Version 4 Protocol" (Publication date not available), 20 pgs.
Periasamy, Anand Babu, "Next-Gen Linux File Systems: Change Is the New Constant", retrieved Mar. 23, 2011, 4 pages.
Platform SDK: File Systems: Microsoft SMB Protocol and CIFS Protocol Overview http://msdn.microsoft.com/ library/default. asp?url=/library/ en-us/fileio/fs/ microsoft_smb_protocol_and_ cifs_protocol_overview.asp; 1 pg.
Pranevich, "The Wonderful World of Linux 2.6"; 2005; 17 pgs.
Rivest, "The MD5 Message-Digest-Algorithm", RFC 1321, Apr. 1992, http://www.jetf.org/rfc/rfc2104.txt, 19 pgs.
Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html; 4 pgs.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SMB: The Server Message Block Protocol [online], 1999, Retrieved from: http://ubiqx.org/cifs/Smb.html; 108 pgs.
SNIA, *Common Internet File System (CIFS) Technical Reference* [online], Mar. 1, 2002, Retrieved from: http://www.snia.org/tech_activities/CIFS/CIFS-TR-1p00_FINAL.pdf; 150 pgs.
Soules et al., *Metadata Efficiency in a Comprehensive Versioning File System*, May 2002; 33 pgs.
Srinivasan et al., Spritely Nfs: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [online], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989.
U.S. Official Action dated Jan. 25, 2010 cited in U.S. Appl. No. 11/182,251.
U.S. Official Action dated Jul. 23, 2010 cited in U.S. Appl. No. 11/182,989.
U.S. Official Action dated Jul. 30, 2010 cited in U.S. Appl. No. 11/182,251.
U.S. Official Action dated Mar. 13, 2009 cited in U.S. Appl. No. 11/182,251.
U.S. Official Action dated May 14, 2009 cited in U.S. Appl. No. 11/182,989.
U.S. Appl. No. 11/182,251, filed Jul. 15, 2005 entitled "Data Communication Protocol".
U.S. Appl. No. 11/182,989, filed Jul. 15, 2005 entitled Data Communication Coordination with Sequence Numbers.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 13/228,818, Amendment and Response filed Oct. 18, 2013, 24 pgs.

(56) References Cited

OTHER PUBLICATIONS

U.S. Appl. No. 13/228,818, Amendment and Response filed Nov. 25, 2013, 28 pgs.
U.S. Appl. No. 13/172,757, Office Action mailed Dec. 6, 2013, 27 pgs.
U.S. Appl. No. 12/964,749, Notice of Allowance mailed Nov. 15, 2013, 2 pgs.
Chinese 1st Office Action in Application 201110329007.4, mailed Oct. 10, 2013, 13 pgs.
U.S. Appl. No. 13/663,827, Amendment and Response filed Aug. 6, 2013, 7 pgs.
U.S. Appl. No. 13/663,827, Advisory Action mailed Aug. 22, 2013, 3 pgs.
U.S. Appl. No. 13/663,827, Amendment and Response filed Sep. 9, 2013, 8 pgs.
U.S. Appl. No. 13/663,827, Notice of Allowance mailed Sep. 26, 2013, 11 pgs.
U.S. Appl. No. 13/664,012, Amendment and Response filed Jul. 30, 2013, 12 pgs.
U.S. Appl. No. 13/664,012, Notice of Allowance mailed Sep. 12, 2013, 14 pgs.
U.S. Appl. No. 13/172,757, Amendment and Response filed Aug. 19, 2013, 14 pgs.
U.S. Appl. No. 12/964,749, Amendment and Response filed Aug. 23, 2013, 8 pgs.
U.S. Appl. No. 12/964,749, Notice of Allowance mailed Sep. 5, 2013, 11 pgs.
U.S. Appl. No. 13/228,818, Office Action mailed Jul. 18, 2013, 18 pgs.
U.S. Appl. No. 12/964,749, Office Action mailed May 23, 2013, 13 pgs.
U.S. Appl. No. 13/663,827, Notice of Allowance mailed Jan. 13, 2014, 10 pgs.
U.S. Appl. No. 13/664,012, Notice of Allowance mailed Dec. 24, 2013, 11 pgs.
U.S. Appl. No. 13/174,271, Office Action mailed Jan. 10, 2014, 17 pgs.
European Intention to Grant in Application 10013021.0, mailed Jan. 28, 2014, 7 pgs.
U.S. Appl. No. 13/664,012, Amendment and Response filed Mar. 19, 2014, 7 pgs.
U.S. Appl. No. 13/228,818, Office Action mailed Mar. 14, 2014, 18 pgs.
U.S. Appl. No. 13/172,757, Amendment and Response filed Mar. 6, 2014, 16 pgs.
U.S. Appl. No. 13/174,271, Amendment and Response filed Apr. 10, 2014, 10 pgs.
U.S. Appl. No. 13/663,827, Notice of Allowance mailed Apr. 25, 2014, 10 pgs.
U.S. Appl. No. 13/664,012, Notice of Allowance mailed May 20, 2014, 13 pgs.
Chinese 1st Office Action in Application 201110462797.3, mailed Apr. 16, 2014, 11 pgs.

* cited by examiner

CLUSTERED CLIENT FAILOVER

BACKGROUND

Clustered environments, e.g., environments where workload is distributed across multiple machines, are commonly used to provide failover and high availability of information to clients. Clustered environments allow clients to access resources via the one or more nodes that are a part of the environment. A clustered environment can act as a client, a server, or both. In a client cluster server, an application may reside on any of the nodes that make up the cluster. The application may issue requests for resources that are stored locally within the client cluster or stored remotely. If an error occurs on the node, the client failover, or migrate, to a different node in the cluster. However, when the client again requests to access a resource that it was working with at the time of the error, the resource may be fenced or locked by the server for the previous client node that the application resided on.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Systems and methods are disclosed herein that provide an application or a process with continuous access to a resource after the application migrates to a new node in a clustered client environment. An application or process residing on a node in a client cluster sends a request to a server to access a resource. In embodiments, a unique application instance identifier is used to identify an application requesting a resource. The unique application identifier may be provided with the request. When the client accesses a resource, the application instance identifier is associated with the requested resource.

Before the application or process completes its operations on the resource, the node upon which the client resides in the clustered environment may experience an error that causes it to fail or otherwise lose access to the resource prior to the application properly releasing the resource. In such circumstances, the resource may remain in a fenced or locked state on the server per the previous client's request. Upon failing over to a different node in the client cluster, the application on the new client node may reestablish a connection with the server managing the resource and make a second request for the resource that the application previously had access to at the time of the error. The second request may include the application instance identifier was sent with the first request. Although the second request for the resource may be received from a different node in the clustered environment, the application instance identifier permits the server managing the request to determine that the second request belongs to the same application or process that had previously locked the resource. Doing so allows the server to invalidate the resource and grant the client's second request to access the resource while insuring a conflict situation does not arise.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Figure 1:
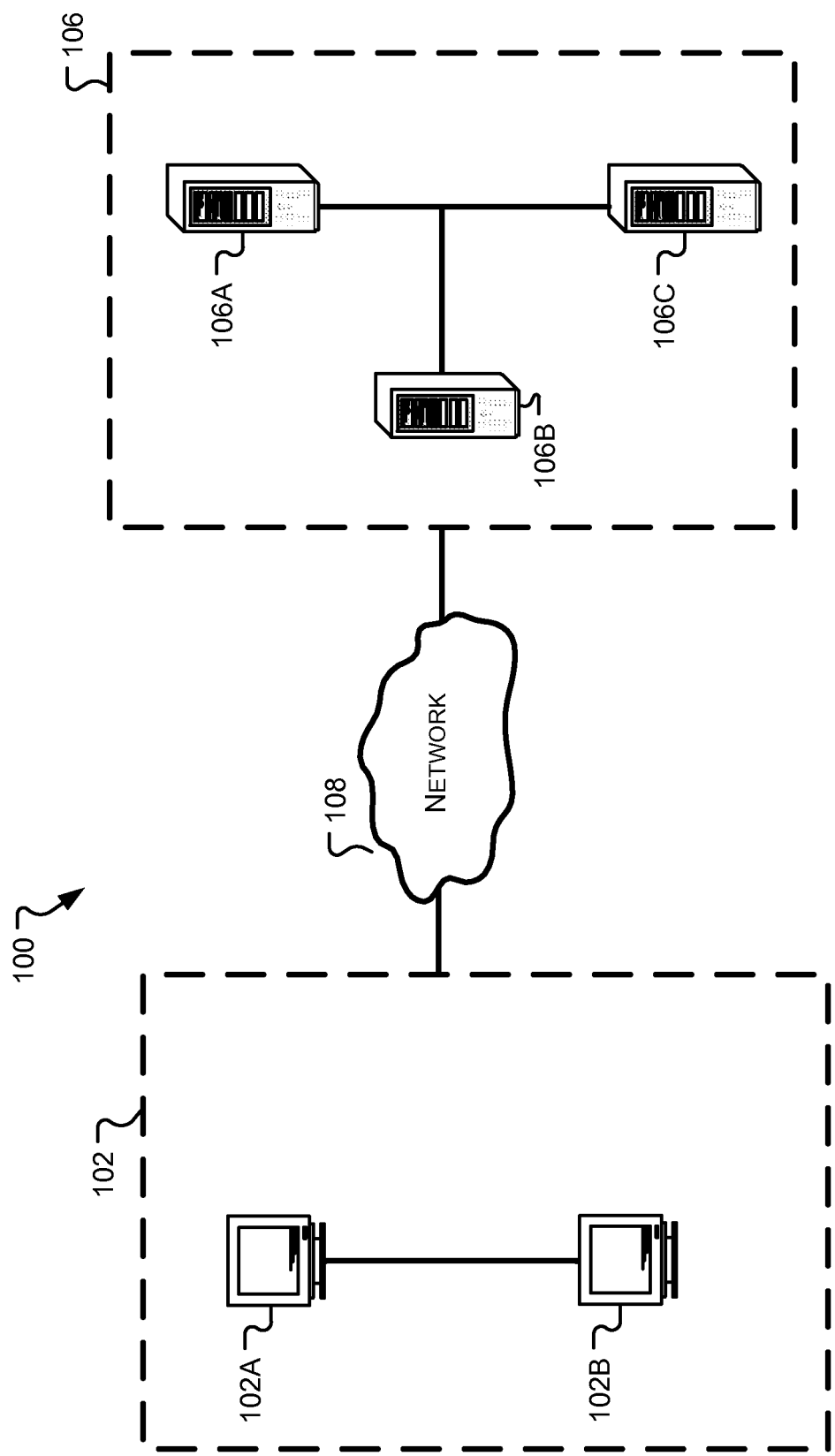
FIG. 1 illustrates a system that may be used to implement embodiments described herein.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Embodiments of the present disclosure are related to providing clustered client failover mechanisms that allow a requestor to regain access to a resource after a failover event. In embodiments, a requestor may be a process, an application, or one or more child processes of an application. A resource may be a file, an object, data, or any other type of resource in a computing environment. In embodiments, a resource may reside on a standalone server or it may reside in a clustered environment. In the embodiments disclosed herein, a clustered environment may include one or more nodes (e.g., client and/or server devices).

In an example embodiment, an application residing on a node in a clustered environment may request access to a particular resource. In embodiments, the resource may be stored locally (e.g., on the client node), in a remote device (e.g., a remote server or a different node in the client clustered environment), or in a clustered environment (e.g., an environment containing multiple nodes) that is different from the client clustered environment. For example, in embodiments the clustered environment may be a client or server cluster; however, one of skill in the art will appreciate that the systems and methods disclosed herein may be employed in any other type of environment, such as, but not limited to, a virtual network.

In such environments, resources may be shared among clients and applications. When an application accesses a resource, the resource may be fenced or locked, thereby prohibiting other applications from accessing the resource until the accessing application releases the resource. Fencing or locking the resource may be employed to protect against a conflict, that is, protect against modification of the resource by another application before the accessing application has performed its operations on the resource. However, if the node in a clustered client environment fails, the application accessing the resource may not properly release the resource from a fenced or locked state. For example, the client node accessing the resource on behalf of the application may lose a network connection, may crash, or may otherwise lose access to the resource prior to the application completing its operations and properly releasing the resource. Thus, the resource may remain in a state in which it is unavailable to other clients or applications. Mechanisms may be employed that automatically release a resource from a fenced or locked state, thereby preventing the resource from being permanently locked out. However, such mechanisms often wait a period of time before releasing a fenced of locked resource.

In some instances, when the application performs a failover to migrate from the failed client node to a different client node in the client cluster, the application may attempt to reestablish its previous connection with the server and resume its operation(s) on the resource via the different client node. However, because the resource was not properly released by the failed client node, which previously accessed the resource on the application's behalf, due to the error, the application that had previous access to the resource may not be able to resume its access of the resource until the server releases the resource from its fenced or locked state. However, because a different node is now attempting to access the resource on the application's behalf, the server may not be able to identify the application as the same application that previously established the lock on the resource. However, because the same application is trying to access the resource, a conflict situation does not exist. In such situations, waiting for the server to release the previous lock on the resource may cause an unacceptable delay for the application.

As described, because the application is operating in a clustered client environment, when the application requests to access the resource a second time, the request to access to the resource may be made from a different location, such as, a different node in the client clustered environment. Thus, the second request may come from a location or different IP address. Because the request may be made from a different location, a server may have difficulty ensuring that the client or application attempting to again access the resource is actually the same client that previously accessed the resource. The systems and methods disclosed herein provide mechanisms to identify situations where the same application is attempting to access a resource, thereby avoiding such delay and providing an application continuous access to the resource.

FIG. 1 illustrates a system 100 that may be used to implement some of the embodiments disclosed herein. System 100 includes client cluster 102 and a server cluster 106. Client cluster includes multiple nodes, such as clients 102A and 102B. Clients 102A and 102B may be a device or application residing in client cluster 102. Client cluster 102 may communicate with server cluster 106 through network 108. In embodiments, network 108 may be the Internet, a WAN, a LAN, or any other type of network known to the art. Server cluster 106 stores resources that are accessed by applications on client cluster 102 (e.g., applications residing on Client 102A or Client 102B). In embodiments, a client (e.g., Client 102A) may establish a session with cluster 106 to access the resources on cluster 106 on behalf of an application residing on the client. Although in FIG. 1 client cluster 102 only includes two clients (e.g., Client 102A and Client 102B), one of skill in the art will appreciate that any number of clients may be included in client cluster 102.

As shown in FIG. 1 server cluster 106 includes servers 106A, 106B, and 106C, which provide both high availability and redundancy for the information stored on cluster 106. In embodiments, the cluster 106 may have a file system, a database, or other information that is accessed by clients 102 and 104. Although three servers are shown in FIG. 1, in other embodiments cluster 106 may include more than three servers, or fewer than three servers. Furthermore, while the embodiments herein described relate to a client communicating with a server that is part of a server cluster, one of skill in the art will appreciate that the embodiments disclosed herein may also be performed using a standalone server.

In embodiments, client cluster 102 provides failover mechanisms that allow a client to migrate from a first client node to a second client node in case of an error or failure occurring on the first client node. One of skill in the art will appreciate that any type of failover mechanism may be employed with the systems and methods disclosed herein. The methods and systems disclosed herein may be employed to avoid undue delay when an application attempts to regain access to a resource migrating from one client to another (e.g., from Client 102A to Client 102B) in the case of a failover. In embodiments, an application instance identifier identifying the application accessing the resource may be associated with the resource. The application instance identifier may be a globally unique identifier (GUID) that is associated with an application, an action performed by an application, or a child process of an application. For example, in one embodiment an application may be associated with an application instance identifier that is a GUID. In another embodiment, an application instance identifier may be associated with a specific operation or action performed by an application. For example, if the application issues two different open requests for two different files, each open request may have its own application instance identifier. In yet another embodiment, an application instance identifier may be associated with one or more child processes of the application. As will be clear to one of skill in the art from the embodiments described herein, associating the application instance identifier of an application with its one or more child processes will allow the child processes to access the resource if the resource is placed in a locked or fenced state that belongs to the application. In embodiments, the application instance identifier may be sent by the client when, or after, sending a request for a resource.

In accordance with another embodiment, in addition to storing information accessed by clients that are a part of client cluster 102, server cluster 106 also provide a failover mechanism that allows continuous access of a resource in case of a server node failure. Again, one of skill in the art will appreciate that any type of failover mechanism may be employed with the systems and methods disclosed herein.

In embodiments, when a client requests access to a resource on behalf of an application, the application instance identifier of the application is sent with the request. The server receiving the request may associate the application instance identifier with the resource. For example, the server cluster may store the application instance identifier in a table or cache located on one or more nodes (e.g., servers such as servers 106A, 106B, and/or 106C) located in the server cluster 106 in such a manner that the application instance identifier is associated with the resource. Before the client is done with the resource, the client may experience an error that will force it to lose connection with the resource. For example, the client hosting the application or performing requests or operations on the application's behalf may lose its network connection to the server cluster, the client may crash, or any other type of error may occur that interferes with the applications use of the resource. Upon experiencing the error, the application may failover to a new client node in the client cluster 102. The new client node may reconnect to the server cluster and send a second request to access the resource on the application's behalf. In embodiments, the client may reconnect to the same node in the sever cluster 106 or a different node. The second request to access the resource may include the application instance identifier of the application. Upon receiving the second request, the sever (e.g., a Server 106A of server cluster 106) compares the application instance identifier of the second request with the application instance identifier associated with the resource. If the two application instance identifiers match, the server cluster invalidates the resource. In embodiments, invalidating the resource may comprise closing a file, removing a lock on the resource, or otherwise taking any action that frees the resource for use. The server node may then grant the application's second request to access the resource. If the application instance identifier of the second node does not match application identifier associated with the resource, the server will not allow access to the resource until the resource becomes free.

To illustrate one embodiment, a requestor (e.g., a process, application, etc.) on Client 102A in client cluster 106 may request that Client 102A establishes a session with a server of server cluster 106. For example, Client 102A may establish a session with server 106A to access a database stored that is on server 106A or that is a part of server cluster 106, in which server 106A may access the database. Client 102A then sends a request for a resource on behalf of the requestor. An application instance identifier that identifies the requestor is associated with the request. In embodiments, the request may include the application instance identifier or the application instance identifier may be sent separately in a manner such that the server 106A can determine that the application instance identifier is associated with the request. In yet another embodiment, the server 106A or the server cluster 106A may already have information needed to associate the application instance identifier with the request without having to receive the application instance identifier along with the request. Server 106A then grants the requestor access to the resource, thereby allowing the requestor to perform operations on or otherwise access the resource. When granting the requestor access to the resource, server 106A associates an application instance identifier with the resource in a manner that indicates the requestor is currently accessing the resource. The resource may then be fenced or locked so other clients or applications cannot access or modify the resource until client 102 has completed its operation.

Before the requestor completes its operations on the resource, an error occurs that causes Client 102A to fail or to otherwise lose its connection to the resource. Because client requestor completed its operation, it has not released control of the resource. Thus, the resource may remain in a fenced or locked state. The requestor or client cluster 102 may employ a failover mechanism to migrate the requestor from client 102A to client 102B. Once the failover operation is complete, client 102B may reconnect to server cluster 106 on the requestor's behalf. Client 102B may reconnect to server 106A or establish a new connection with any other server in server cluster 106 (e.g., server 106B or 106C). In an example situation, Client 102B reconnects to server 106A. Upon reconnecting, the client 102B may send a second request to access the resource on behalf of the requestor. As previously noted, because the requestor did not release control the resource, the resource may still be in a locked or fenced state. In order to access the resource, without waiting for the server to automatically change the state of the resource, for example, through a time out operation, the requestor may again provide its application instance identifier with the second request. Server 106A compares the application instance identifier provided with the second request to the application instance identifier associated with the resource. For example, by comparing the application instance identifier received or otherwise associated with the second request to an application instance identifier that Server 106A associated with the resource. The associated application instance identifier may be stored in a local cache or table of server 106A, or it may be stored elsewhere in server cluster 106. If the application instance identifier stored in the cache matches the application instance identifier that is associated with the resource, server 106A invalidates or otherwise frees the resource and allows client 102B to again access the resource on the requestor's behalf without waiting for the resource to be released by some other mechanism (e.g., by the fenced or locked state timing out). If the application instance identifiers do not match, Client 102B will have to wait for the resource to become free before accessing it.

While in the above example Client 102B reconnected to the same server 106A, it is also possible, in other embodiments, for the client to connect to another node in server cluster 106. For example, client 102B may reconnect to server 106B and submit a second request to regain access to the resource on behalf of the requestor. The second request may again be associated with the requestor's application instance identifier, for example, by being included in the second request or otherwise associated with the second request. In this example, Server 106B may not have the application instance identifier associated with the resource stored in its local cache because the original access of the resource was on server 106A. In such a situation, server 106B may contact the other servers in server cluster 106 to determine if they have an application identifier associated with the resource. If the application identifier associated with the resource is stored on a different node in the server cluster (e.g., server 106A), the application instance identifier on the other node in the server cluster is compared with the application instance identifier provided with the second request. If they match, server 106B may send a request to server 106A to invalidate the resource, and then server 106B may allow the requestor (now on client 102B) to access the resource. If the application instance identifiers do not match, Client 102B will have to wait for the resource to free.

Based on the above examples, one of skill in the art will appreciate that any client node in the client cluster 102 may request to access for, and then provide access to, a requestor in the client cluster 102. Furthermore, any server node in a server cluster (e.g., any server in server cluster 106) is capable of determining whether the requestor previously had access to the resource even if the access occurred on a different server node in the server cluster. One of skill in the art will appreciate that the following description is merely one example of how the embodiment shown in FIG. 1 may operate and other embodiments exist. For example, rather than accessing resources on a remote server or server cluster, a client nodes may perform the embodiments described herein to provide requestors (e.g., applications or processes) continuous access to resources residing in the clustered environment (e.g., on the same or different client cluster nodes that make up the client cluster). As described in greater detail below, embodiments described herein may involve various different steps or operations. Furthermore, the embodiments described herein may be implemented using any appropriate software or hardware component or module.

Figure 2:
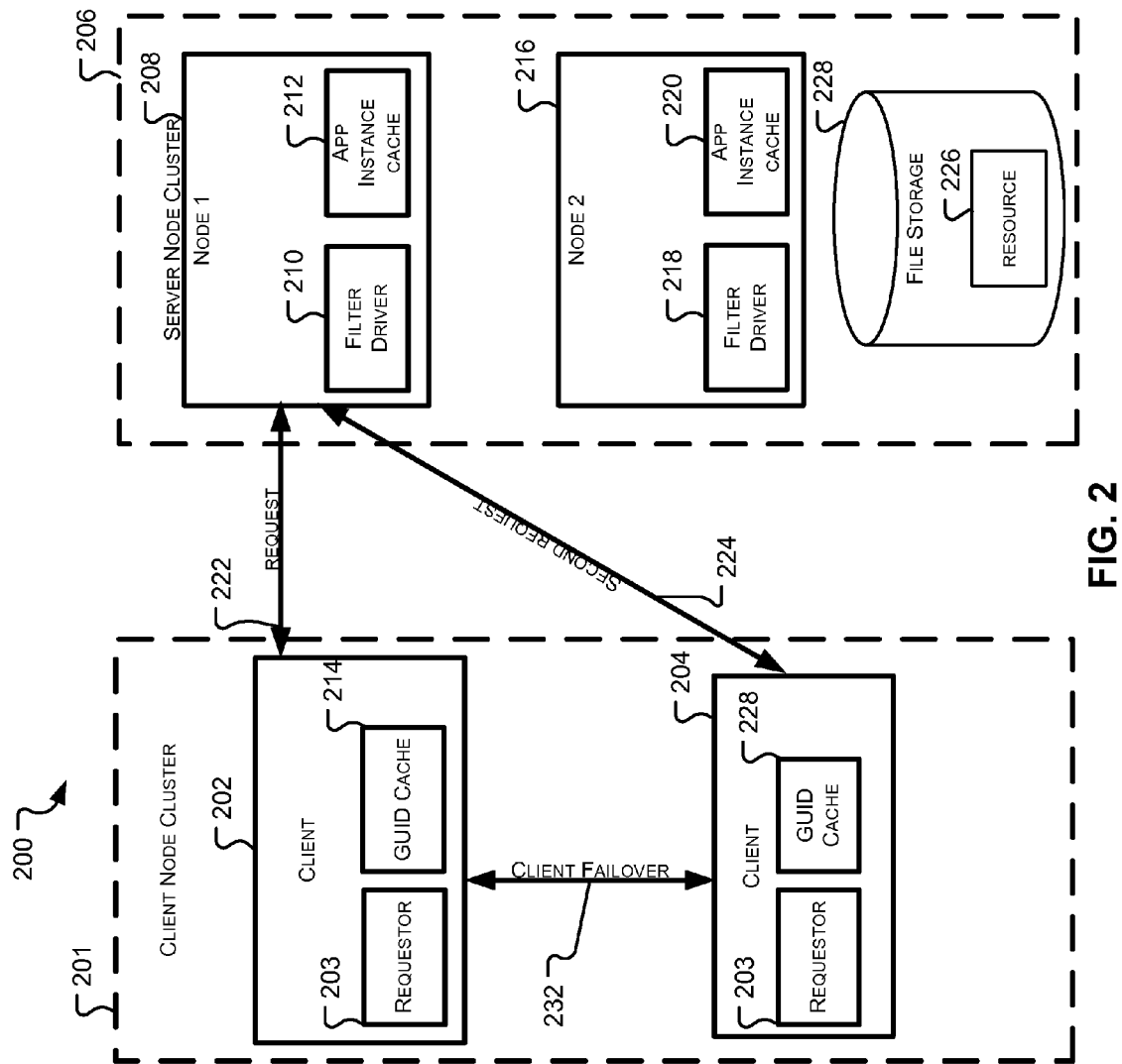
FIG. 2 is a block diagram illustrating a software environment that may be used to implement the embodiments disclosed herein.

Turning now to FIG. 2, the figure illustrates a block diagram of a software environment 200 showing client node cluster 201 with multiple client nodes (e.g., clients 202 and 204) and a server node cluster 206 with multiple server nodes (e.g., Node 1 208 and Node 2 216). In embodiments, client 202 requests to access a resource, such as resource 226, in a server cluster environment 206 on behalf of a requestor. Client node cluster 201 may be a client cluster such as client cluster 102 (FIG. 1). Although not illustrated, client cluster may contain more than two clients. Server node cluster 206, may be a server cluster, such as server cluster 106 (FIG. 1) or it may be any other type of clustered environment such as, but not limited to, a virtual network. Resource 226 may be stored in a datastore 228 that is part of the clustered environment. Although not shown, in alternate embodiments, the datastore 228 may not be part of the clustered environment, but may be connected to the clustered environment over a network. Examples of such a network include, but are not limited to, the Internet, a WAN, a LAN, or any other type of network known to the art. In still further embodiments, datastore may be part of a node (e.g., a device) that is a part of cluster 206.

Server node cluster 206 may include one or more nodes, such as Node 1 208 and Node 2 216. Although only two node clusters are illustrated in FIG. 2, any number of node clusters may be included in clustered environment 206. In embodiments, node clusters 208 and 216 are capable of receiving a request for, performing an operation on, and/or granting access to resource 226. In embodiments, resource 226 may be a file, an object, an application, data, or any other type of resource stored on or accessible by node in node cluster 206 or by a standalone server.

In embodiments, a client sends an initial request 222 to clustered environment 206. As illustrated in FIG. 2, the initial request 222 may be sent by client 202 and received by Node 1 208. However, in alternate embodiments, the initial request 222 may be sent by client or any other client node in client cluster 201 and received by Node 2 216 or any other node in server cluster 206. An example requests include, but are not limited to, requests to create, open, or otherwise access a file. Request 222 may be transmitted from the client to the Node cluster via a network such as, but not limited to, the Internet, a WAN, a LAN, or any other type of network known to the art. Initial request 222 may include a request to access a resource, such as resource 226. In embodiments, request 222 may also include an application instance identifier that identifies the requestor that client 202 is making the request on behalf of. In embodiments, initial request 222 may consist of one or more messages. For example, request 222 may be a single message containing both the request and an application instance identifier. In another embodiment, request 222 may be multiple messages that include one or more requests as well as one or more application instance identifiers. In embodiments, client 202 may include an App Instance Cache 214 that is used to store and/or generate one or more application instance identifiers that may be transmitted with request 222.

As shown in FIG. 2, Node 1 208 may receive request 222 and an application instance identifier from client 202. If the requested resource 226 is available, e.g., not fenced or locked by another client or application, Node 1 may grant the client's (e.g., client 202) request to access resource 226 on behalf of a requestor that is executing on the client. Upon granting access to resource 226, filter driver 210 may allocate or otherwise create an association between client 202 and the resource 226 by storing the application instance identifier it received from client 202. In embodiments, the association may be stored in as an object in app instance cache 212 that is a part of Node 1. Although the illustrated embodiment shows app instance cache 212 as a part of Node 1 208, in embodiments, app instance cache 212 may be stored elsewhere as a part of node cluster 206. One of skill in the art will appreciate Node cluster 206 may include one or more app instance caches, such as app instance cache 220 on Node 2 216. In embodiments when more than one app instance cache is present, the data stored in the multiple app instance caches may be replicated across all app instance caches, or each app instance cache may store separate data.

In one embodiment, the application instance identifier received from client an application instance identifier that identifies a requestor (e.g., an application or process) may be stored in a _NETWORK_APP_INSTANCE_ECP_CONTEXT structure. The _NETWORK_APP_INSTANCE_ECP_CONTEXT structure may be defined as follows:

```
typedef struct _NETWORK_APP_INSTANCE_ECP_CONTEXT {
USHORT Size;
USHORT Reserved;
GUID AppInstanceID;
} _NETWORK_APP_INSTANCE_ECP_CONTEXT,
*PNETWORK_APP_INSTANCE_ECP_CONTEXT;
```

In such embodiments, the variable size may store information related to the size of the structure and the variable AppInstanceID may be a unique application instance identifier for a failover cluster client application, such as a requestor executing on client 202. In embodiments, the _NETWORK_APP_INSTANCE_ECP_CONTEXT, or another object or variable containing the requestor's application instance identifier may be stored in the globally unique identifier (GUID) cache 214. In embodiments the _NETWORK_APP_INSTANCE_ECP_CONTEXT structure may be sent from a client to a server in association with a request to access a resource (e.g., a create or open request) In one embodiment, the requestor's application instance identifier may be stored in the GUID cache of the client node that the requestor is executing on in the clustered client environment 201. In another embodiment, although not shown in FIG. 2, the client node cluster 201 may have a central repository that stores application instance identifiers. In such an embodiment, multiple client nodes in the client node cluster 201 may access the centralized repository. In yet another embodiment, application instance identifiers may be stored across multiple GUID caches (e.g., GUID cache 214 and GUID cache 216). In such embodiments, the client node cluster 201 may employ a replication algorithm to ensure that the multiple GUID caches contain the same application instance identifiers.

As previously described, the application instance identifier may be associated with resource 226 while client 202 accesses resource 226 on behalf of a requestor. A server node 206 may store such an association in one or more app instance caches that are part of server node cluster 206, such as app instance caches 212 and 220. In one embodiment, the application instance identifier may be associated with the resource by adding it to an Extra Create Parameter (ECP) list for the resource 226. The ECP list may be stored in an app instance cache that is part of the server node cluster 206, such as app instance caches 212 and 220. In embodiments, when an ECP is received by a server, the server extracts an application instance identifier from the ECP and adds it to a cache to be associated with a resource, resource handle, etc. As described with respect to storing application instance identifiers in client cluster 201, the application instance identifiers associated with a node may be stored in an individual app instance cache on node in server node cluster 206, in a central repository in server cluster 206, or replicated across multiple app instance caches on multiple nodes in server node cluster 206.

In embodiments, resource 226 is fenced or locked while a requestor executing on client 202 has access to resource 222, thereby preventing other client or applications from accessing resource 226 and avoiding any potential conflicts. In embodiments, before the requestor completes its operation on resource 226, client 202 experiences an error that causes it to lose connection with the resource. For example, the client may crash, be taken offline, or lose its network connection to server node 208. In such instances, resource 226 may still be in a fenced or locked state because the requestor did not release a lock on the resource, thereby preventing other clients from accessing resource 226.

When the error occurs to client 202, the requestor may utilize a client failover mechanism 232 to migrate to a new client node (e.g., client 204) in the client cluster 201. One of skill in the art will appreciate that any type of failover mechanism may be employed at client failover 232. In embodiments, the failover mechanism 232 may also include the migration of the requestor's application instance identifier which may have been stored in GUID cache 214 on the now failed client 202. Upon completing the migration, the requestor may attempt to regain access to the resource 202. In embodiments, client 216 may send a second request 224 to Node 1 to request access to resource 226 on behalf of the requestor. However without the continuous access embodiments disclosed herein, when Node 1 208 receives a request to access the resource 226 on behalf of client 204 (the sender of second request 224), it may deny the request because resource 226 is still in a fenced or locked state from the previous access that client 202 made on behalf of the resource. Without the embodiments disclosed herein, Node 1 208 would recognize that the second request to access resource 226 was from a different location (e.g., client 204). Node 1 208 would not be able to determine that the request is for the same requestor that holds the lock on resource 226, and would therefore determine that granting the request would result in a conflict. However, if the same requestor is attempting to access resource 224, there is no issue of conflict and forcing the client to wait for the resource to be freed by the system may result in undue delays.

The application instance identifier may be used to solve this problem. In embodiments, the second request 224 may also include the application instance identifier from identifying the requestor that migrated to client 204 during the failover shown at 232. In embodiments, the requestor's application instance identifier may be present in the GUID cache 228 of client 204 prior to the migration of the requestor during the client failover 232. For example, a replication mechanism may have been employed to replicate the requestor's application instance identifier across the nodes in client cluster 201. In another embodiment, the requestor 203 may store its application instance identifier. In yet another embodiment, the requestor's 203 application instance identifier may be migrated during client failover 232.

As described with respect to request 222, the application instance identifier may be transmitted in the same message as the second request 224 or the second request 224 may be composed of a number of different messages. When the second request is received at the node cluster 206, or an individual node in the cluster, such as Node 1 208, and the receiving server determines that the resource is fenced or locked, a determination is made as to whether the application instance identifier in the second request 224 is the same as the application instance identifier associated with resource 226. In embodiments, Node 2 216 will compare the application instance identifier received with the second request 222 with the application instance identifier that is associated with resource 226. The application identifier associated with resource 220 may be stored in the app instance cache 212 of Node 1 212. In embodiments where multiple app instance caches exist in node cluster 206, the determination may check more than one application instance caches in the node cluster 206. In such embodiments, if a matching application instance identifier is not located in app instance cache 212, Node 1 216 may send a request to Node 2 212 to determine if a matching application instance identifier is located in app instance cache 220.

In one embodiment, if the application instance identifier received in second request 224 does not match the application instance identifier associated with resource 226 (which may be stored in application instance cache 212 and/or 220), the second request 224 may not be granted until resource 226 is free. However, if a match is found, the receiving server (e.g., Node 1 208) and/or the server node cluster 206 perform actions to grant access to resource 226 without causing undue delay to client 204 and requestor 203. In such instances, node cluster 206 may invalidate the resource 226, thereby removing resource 226 from a fenced or locked state. In embodiments, invaliding a previous access may comprise any action that brings a resource out of a fenced or locked state. One non-limiting example is closing an opened file (e.g., if resource 226 is a file). Once the previous access is invalidated, the second request 224 to access resource 226 may be granted, thereby providing continuous access to the requestor 203.

In one embodiment, the node receiving the second request 224, such as Node 1 208 in FIG. 2, may perform the required actions to invalidate the previous access of resource 226 if a different node (e.g., Node 2 216) has access and/or permission to invalidate the previous access. However, in some instances, the node receiving the request may not have access or permission to invalidate the previous access. For example, such an instance may occur if the original request 222 was made to Node 2 216, in which case Node 2 216 may have control over the resource. In such instances, the node receiving the second request 224 may send a request to the controlling node to invalidate the previous access. Once the controlling node has invalidated the previous access, the node receiving the second request 224 may grant the second request 224. In other embodiments, the node receiving the second request 224 may send a request to a different node to grant client 204 and/or requestor 203 (now residing on client 204) access to resource 226.

The described process avoids undue delay in granting a second request 224 to access a resource 226 from a resource 203 that previously accessed and still holds a lock on resource 226 through the use of application instance identifiers. Furthermore, the application instance identifiers provide the benefit of ensuring that any request granted does not create a conflict on resource 226. For example, if the request was received from a different application, the request will include an application instance identifier that is different from the application instance identifier associated with the resource which would result in the request being denied. Because application instance identifiers are globally unique identifiers, the application instance identifier for different applications will not be the same.

Figure 3:
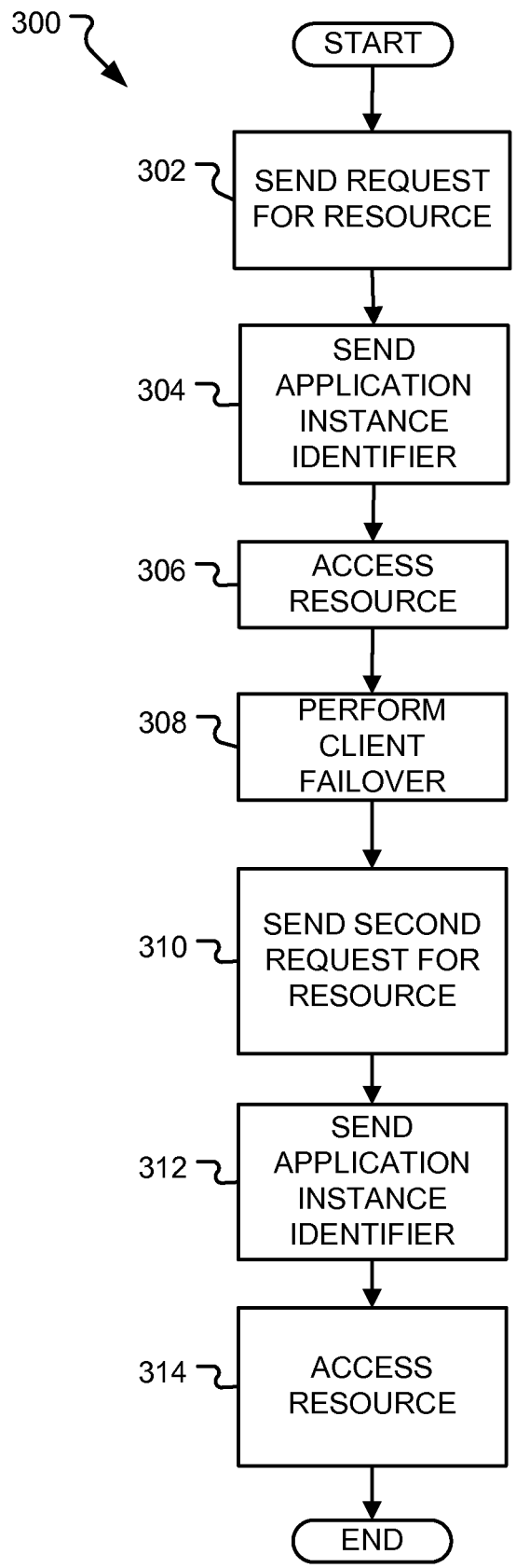
FIG. 3 is an embodiment of a method that a client may perform to gain continuous access to a resource in a clustered environment.

FIG. 3 is an embodiment of a method 300 that a requestor may employ to gain continuous access to a resource in a client clustered environment. For example, a requestor may be a client, such as client 202 (FIG. 2), that employs the method 300 to access a resource (e.g., resource 226). In embodiments, the resource may reside on a remote machine, such as a server. The server may be a standalone server or part of a clustered environment, such as sever cluster 206 (FIG. 2). Flow begins at operation 302 where a request for a resource is sent to a server. In embodiments, the request may be to access a resource. In embodiments, accessing a resource may comprise opening a file, creating a file, or otherwise accessing or performing an operation on a resource that may be remote to a client. In embodiments, a requestor may operate in a client clustered environment. In such embodiments, the request sent at operation 302 may be sent from a first client in the client clustered environment.

Flow continues to operation 304 where an application instance identifier is sent, for example, to a server (e.g., a standalone server or a node in a clustered environment). In one embodiment, the first client that sent the request may also send the application instance identifier on behalf of the requestor. As earlier described, an application instance identifier is a GUID identifying the requestor (e.g., an application, client, or a child process of an application requesting access to a resource). In one embodiment, the application instance identifier may be sent in a message transmitted via a network. The application instance identifier may be transmitted in the same message containing the request in operation 302 or it may be transmitted in a different message. In such embodiments, an object containing the application instance identifier, such as but not limited to the _NETWORK_APP_INSTANCE_ECP_CONTEXT described with respect to FIG. 2, may be sent at operation 302.

In one embodiment, an interface may be used to send the application instance identifier at operation 304. The interface may be a kernel level interface located on a client or available to a client operating in a client clustered environment. In embodiments, the kernel level interface may be used by the requestor and/or client to send an application instance identifier to a server. The following is a non-limiting example of a kernel level interface that may be employed at operation 304 to send an application instance identifier:

```
#if (NTDDI_VERSION >= NTDDI_WIN8)
//
// ECP context for an application to provide its instance ID.
//
typedef struct _NETWORK_APP_INSTANCE_ECP_CONTEXT {
    //
    // This must be set to the size of this structure.
    //
    USHORT Size;
    //
    // This must be set to zero.
    //
    USHORT Reserved;
    //
    // The caller places a GUID that should always be unique for a single
    //instance of the application.
    //
    GUID AppInstanceID;
} NETWORK_APP_INSTANCE_ECP_CONTEXT,
*PNETWORK_APP_INSTANCE_ECP_CONTEXT;
//
// The GUID used for the APP_INSTANCE_ECP_CONTEXT structure.
//
// {6AA6BC45-A7EF-4af7-9008-FA462E144D74}
//
DEFINE_GUID(GUID_ECP_NETWORK_APP_INSTANCE,
0x6aa6bc45, 0xa7ef, 0x4af7, 0x90, 0x8, 0xfa, 0x46, 0x2e, 0x14, 0x4d,
0x74);
#endif // NTDDI_Version >= NTDDI_WIN8
```

Although a specific kernel level interface is provided, one of skill in the art will appreciate that other kernel level interfaces may be employed at operation 304 to send the application instance identifier.

In another embodiment, an application user interface (API) may be employed at operation 304 to send an application instance identifier. In such embodiment, the requestor and/or client may send an application instance identifier by making a call to the API. The API may be hosted on the client performing the operation 304 (e.g., the first client in a server cluster) or the API may be hosted on another device and accessed by the requestor or another application or process. The following is a non-limiting example of an API that may be employed at operation 304 to send an application instance identifier:

```
NTSTATUS RegisterAppInstance (
    _in PGUID     AppInstance
);
```

Although a specific API is provided, one of skill in the art will appreciate that other API's may be employed at operation 304. Furthermore, although operation 304 is illustrated as a discrete operation, one of skill in the art will appreciate that sending the application instance identifier may be performed simultaneously with sending the request at operation 302.

When the requested resource is not locked, the request sent at operation 302 is granted and flow continues to operation 306 where the resource is accessed. As previously described, the server or device controlling the resource may place the resource in a fenced or locked state while the requestor accesses the resource at operation 306. At some point while accessing the resource, an error occurs, such as the errors described with reference to FIG. 2 which causes the client to fail or otherwise lose connection to the resource. The error may cause the client (e.g., the first client in the server cluster) to lose access to the resource before the requestor completes its use of the resource. Under such circumstances, the resource may not be released from its fenced or locked state.

Flow continues to operation 308, where a failover operation is performed. In embodiments, the failover operation may comprise cloning the requestor and its state to a different client in the client node cluster (e.g., a second client). In embodiments, the requestor's state may be cloned on the second on the second and the requestor may be executed on the second client in a manner such that it can resume execution from the point where the first client failed. In another embodiment, the requestor may be in communication with the first client (rather than executing on) at the time of the first clients failover. In such embodiments, the failover operation may comprise the requestor establishing communications with a second client in the client cluster.

In embodiments, state information, including but not limited to the requestors application instance identifier, may be transferred from the first client to the second client. In one embodiment, the first client may send a message including the requestor's application instance identifier and/or the requestor's state information. The application instance identifier and/or state may be sent during the failover process or, in embodiments, may be sent before the first client fails, such as, during a replication process that clone's information across the clients in a client clustered environment. In another embodiment, the requestor's application instance identifier and/or state information may be stored in a central location or repository in the client clustered network. In such embodiments, the failover process may provide the second client with the location of the requestor's application instance identifier and/or state information. In yet another embodiment, the requestor may maintain its application instance identifier. In such embodiments, the client failover operation may comprise relocating to or otherwise establishing a connection between the requestor and a second client.

In embodiments, after the client failover operation flow continues to operation 310. At operation 310 a second request for the same resource is sent to the clustered environment. In embodiments, the second request is sent by the second client in the client cluster on behalf of the requestor. The second request may be sent using the same manner as described with respect to the first resource at operation 302. In order to maintain continuous access to the resource and avoid undue delay, flow continues to operation 312 where the application instance identifier is again sent to the clustered environment. The application instance identifier may be sent at operation 308 according to one of the embodiments described with respect to operation 304. In embodiments, because the a different client (e.g., the second client) is sending the second request, the server receiving the request may not be able to identifier the second request as belonging to the same requestor that holds a lock on the resource (e.g., because the request is made from a different machine, a different address etc.) However, by sending the application instance identifiers at operations 304 and 308, the server will be able to identify the requests as belonging to the same requestor, and will grant continuous access to the resource as previously described with respect to FIGS. 1 and 2. Flow continues to operation 314 and the requestor resumes access to the resource. In embodiments, the second client may receive a response to the second request from the server indicating that the server granted the second request. In embodiments, upon receiving the indication, the second client may access the resource on behalf of the requestor.

Figure 4:
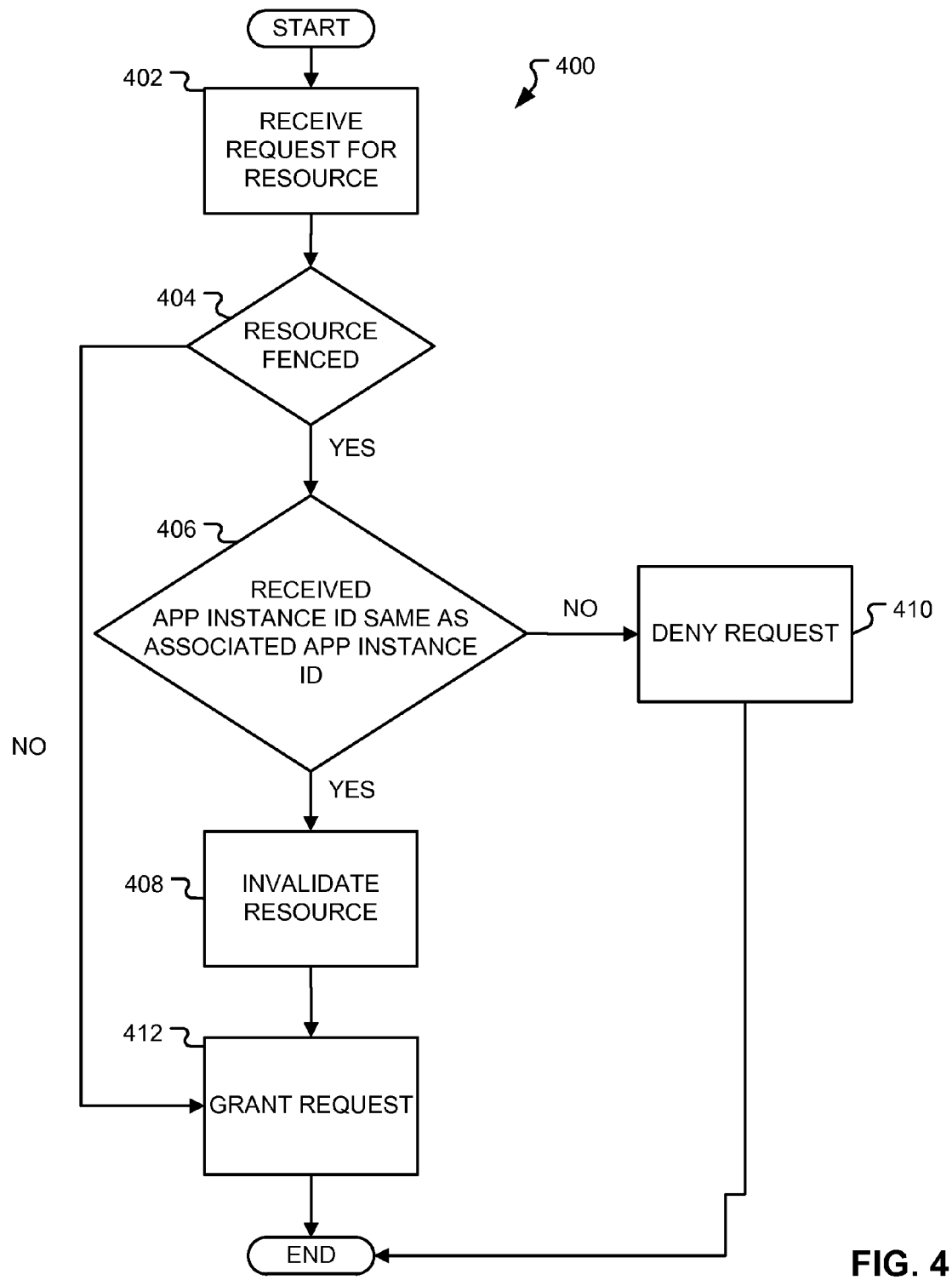
FIG. 4 is an embodiment of a method performed by a node in a clustered environment to provide continuous access to a resource.

FIG. 4 is an embodiment of a method 400 performed by a node in a server clustered environment to provide continuous access to a resource. Embodiments of the method 400 may be performed by a node such as Node 1 208 (FIG. 2) in a clustered environment, such as node cluster 206 (FIG. 2). In embodiments, method 400 may be performed by a node that has access to a resource. Flow begins at operation 402 where the node receives a request for a resource. In embodiments, a resource may be a file, an object, a method, data, or any other type of resource that is under the control of and/or may be accessed by the node performing operation 400. An application instance identifier may be received with the request at operation 402.

Flow continues to decision operation 404 where a determination is made as to whether the resource is in a fenced or locked state. One of skill in the art will appreciate that any manner of determining whether a resource is fenced or locked may be employed at operation 404. If the resource is not in a fenced or locked state, flow branches NO to operation 412 where the request for the resource is granted. In embodiments, granting the request may comprise allowing the requestor access to the resource, performing an operation on the resource on behalf of the requestor, or permitting any kind of access or modification to the resource. For example, granting the request in operation 412 may include opening a file or creating a file.

If the resource is in a fenced or locked state, flow branches YES from operation 404 to decision operation 406. At decision operation 406, the application instance identifier received with the request at operation 402 is compared to an application instance identifier that is associated with the resource. For example, as describe with respect to FIG. 2, a node may associate an application instance identifier with a resource when a client or application accesses a resource. As described earlier, the association of the application instance identifier of a requestor accessing a resource may be stored on a node, for example, in an app instance cache, as described in various embodiments discussed in FIG. 2. In embodiments, the application instance identifier that is provided in an ECP sent with a request for a resource, for example, in a _NETWORK_APP_INSTANCE_ECP_CONTEXT structure, may be added to an ECP list associated with the resource.

In one embodiment, the association of the application instance resource may reside locally on the node performing method 400. In such instances, the comparison may be made at a local app instance cache resident on the server. However, as discussed with respect to FIG. 2, a clustered environment may contain a number of app instance caches distributed across different nodes. Furthermore, the different application instance caches may each store separate and/or different data. The application identifier associated with the fenced or locked resource may be stored on a different node in the clustered environment. In such instances, operation 406 may include sending a request to a different node to perform the comparison at operation 406. The request may include the application instance identifier received at operation 402.

If the received application instance identifier is not the same as the application instance identifier associated with the resource, flow branches NO to operation 410. At operation 410 the request to access the resource received at operation 402 is denied. In embodiments, the request may be denied in order to avoid a resource conflict. Because the received application identifier is not the same as the associated application instance identifier, the request to access the resource received at operation 402 is from a different requestor or application. Granting a request to the different client or application, as may be in this case, may cause a conflict situation that will interfere with the application currently accessing the resource. For example, the different application may modify the resource in a manner that modifies or otherwise interferes with the operations performed on the resource by the requestor that currently holds a lock on the resource.

However, receiving an application identifier with the request 402 that is the same as the application identifier associated with the fenced or locked resources indicates that an error may have occurred that caused the requestor that was accessing the resource to lose its access to the resource without properly releasing the resource. For example, the requestor may operate in a client node cluster. The particular client the requestor was operating on may have lost connection to the server or otherwise failed before the requestor completed its operations upon the resource. In order to provide continuous access the resource, that is, to allow the requestor to regain access to the resource without experiencing undue or unacceptable delay, flow branches YES to operation 408.

At operation 408, the resource is invalidated. As earlier described herein, invalidating the resource may include changing the fenced state of the resource or otherwise removing a lock on the resource. For example, if the resource is a file, invalidating the resource may include closing the file. One of skill in the art will appreciate that any method of releasing a fenced or locked resource may be employed at operation 408.

Referring back to FIG. 2, in embodiments, access to a resource may be under control of a node in the clustered environment different than the node that receives the request for access to the resource at operation 402. For example, a handle to the resource may reside on a different node in the clustered environment. In such embodiments, invalidating the resource may include sending a request to the node controlling access to the resource to invalidate the resource. In response to sending the request, the remote node may invalidate the resource.

After the resource is invalidated, flow continues to operation 412 where the request to access the resource is granted. Granting the request may comprise allowing the requestor access to the resource, performing an operation on the resource on behalf of the requestor, or permitting any kind of access or modification to the resource. For example, granting the request in operation 412 may include opening a file or creating a file. Granting such access may be performed by the node receiving the request at operation 402, or by another node in the clustered environment.

Methods 300 and 400 are merely some examples of operational flows that may be performed in accordance with embodiments. Embodiments are not limited to the specific description provided above with respect to FIGS. 3-6 and may include additional operations. Further, operational steps depicted may be combined into other steps and/or rearranged. Further, fewer or additional steps may be used, employed with the methods described in FIGS. 3-4.

Figure 5:
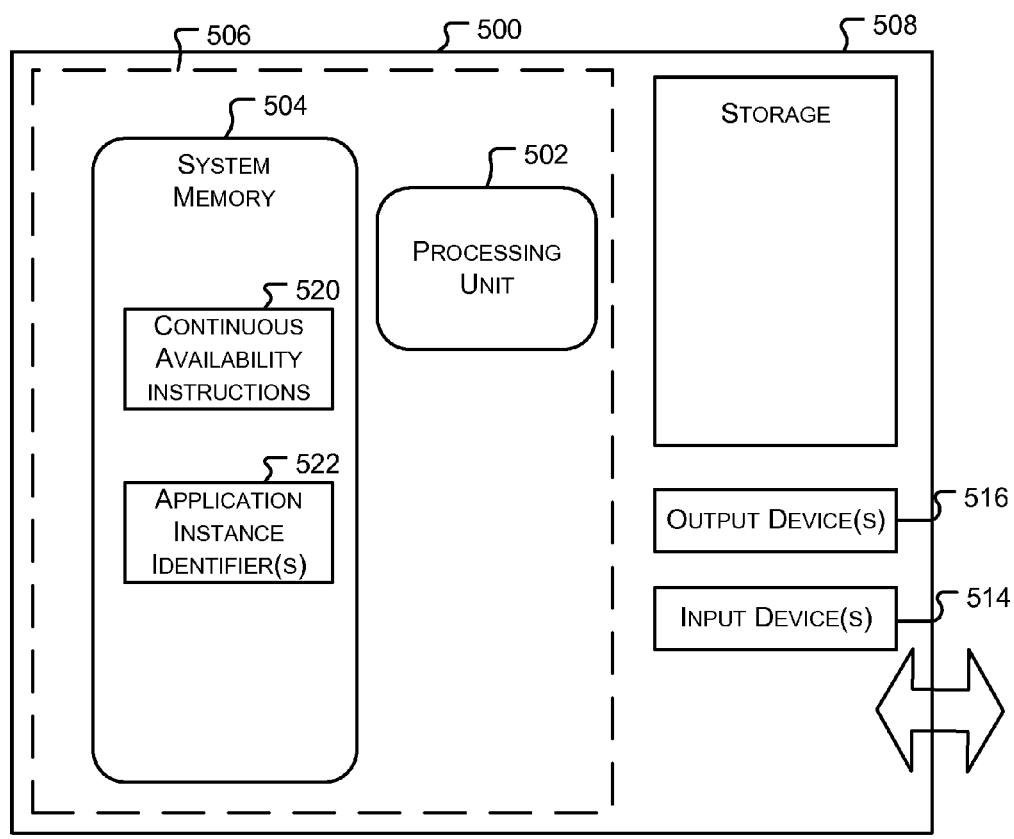
FIG. 5 illustrates a block diagram of a computing environment suitable for implementing embodiments.

FIG. 5 illustrates a general computer system 500, which can be used to implement the embodiments described herein. The computer system 500 is only one example of a computing environment and is not intended to suggest any limitation as to the scope of use or functionality of the computer and network architectures. Neither should the computer system 500 be interpreted as having any dependency or requirement relating to any one or combination of components illustrated in the example computer system 500. In embodiments, system 500 may be used as the clients and/or servers described above with respect to FIGS. 1 and 2.

In its most basic configuration, system 500 typically includes at least one processing unit 502 and memory 504. Depending on the exact configuration and type of computing device, memory 504 may be volatile (such as RAM), non-volatile (such as ROM, flash memory, etc.) or some combination. This most basic configuration is illustrated in FIG. 5 by dashed line 506. System memory 504 stores instructions 520 such as the instructions to perform the continuous availability methods disclosed herein and data 522 such as application instance identifiers that may be stored in a file storage system with storage such as storage 508.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage, and non-removable storage 508 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 514 such as a keyboard, a mouse, a pen, a sound input device, a touch input device, etc. Output device(s) 516 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 500 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A method of providing continuous access to a resource, the method comprising:
   receiving a first request to access a resource by a process, wherein the request is received from a first client in a client cluster;
   associating a first application instance identifier with the resource;
   granting the first request to access the resource;

receiving a second request to access the resource by the process after loss of connection with the first client, wherein the second request is received from a second client in the client cluster and the second client is different from the first client;

receiving a second application instance identifier associated with the second request;

determining that the first and second application instance identifiers are the same; and invalidating the first request, wherein invalidating the first request comprises:

determining that the resource is not located on the first node that receives the second request;

sending a request to a second node to invalidate the resource; and granting the second request to access the resource on the first node.

2. The method of claim 1, wherein the first application instance identifier is associated with an application instance of an open request.

3. The method of claim 1, wherein the first application instance identifier is associated with the process.

4. The method of claim 1, wherein the first application instance identifier is associated with at least one child process of the process.

5. The method of claim 1, further comprising storing the first application instance identifier in a registry.

6. The method of claim 1, wherein associating the first application instance identifier comprises receiving the first application instance identifier in a NETWORK_APP_INSTANCE_ECP_CONTEXT structure.

7. The method of claim 6, wherein the first application instance identifier in the NETWORK_APP_INSTANCE_ECP_CONTEXT structure is added to an Extra Create Parameter (ECP) list.

8. The method of claim 1, wherein the process comprises an application.

9. A system for facilitating client failover in a clustered environment, the system comprising:

at least one server comprising:

at least one processor configured to execute a first set of computer executable instructions;

at least one computer readable storage media storing the first set of computer executable instructions, wherein the first set of computer executable instructions, when executed by the at least one processor comprise instructions for:

receiving a first request to access a resource from a first client in a client cluster, wherein the first client sends the first request on behalf of a process;

associating a first application instance identifier with the first resource;

allowing the process access to the resource;

receiving a second request for the resource from a second client in the client cluster on behalf of the process after loss of connection with the first client, wherein the second client is different from the first client;

receiving a second application instance identifier associated with the second request;

determining that the first and second application instance identifiers are the same; and invalidating the first request, wherein invalidating the first request comprises:

determining that the resource is not located on the first node that receives the second request;

sending a request to a second node to invalidate the resource; and granting the second request to access the resource on the first node.

10. The system of claim 9, wherein the system further comprises:

the first client, comprising:

at least one processor configured to execute a second set of computer executable instructions;

at least one computer readable storage media storing the second set of computer executable instructions, wherein the second set of computer executable instructions, when executed by the at least one processor, comprise instructions for:

sending the first request;

sending the first application instance identifier to the second client.

11. The system of claim 10, wherein the second client further comprises:

at least one processor configured to execute a third set of computer executable instructions;

at least one computer readable storage media storing the third set of computer executable instructions, wherein the third set of computer executable instructions, when executed by the at least one processor, comprise instructions for:

receiving first the application instance identifier from the first client; and sending the second request to access the resource with the application instance identifier.

12. The system of claim 9, wherein the process comprises an application.

13. The system of claim 9, wherein the first application instance identifier is associated with at least one child process of the process.

14. The system of claim 9, wherein the first application instance identifier is associated with an application instance of an open request.

15. The system of claim 9, wherein the first application instance identifier is associated with the process.

16. A computer readable storage media, wherein computer storage media is not a signal, storing computer executable instructions that, when executed by a processor, comprise instructions for:

receiving a first request to access a resource from a first client in a client cluster, wherein the first client sends the first request on behalf of a process;

associating a first application instance identifier with the first resource;

allowing the process access to the resource;

receiving a second request for the resource from a second client in the client cluster on behalf of the process after loss of connection with the first client, wherein the second client is different from the first client;

receiving a second application instance identifier associated with the second request;

determining that the first and second application instance identifiers are the same; and invalidating the first request, wherein invalidating the first request comprises:

determining that the resource is not located on the first node that receives the second request;

sending a request to a second node to invalidate the resource; and granting the second request to access the resource on the first node.

17. The computer readable storage media of claim 16, wherein the process comprises an application.

18. The computer readable storage media of claim 16, wherein the first application instance identifier is associated with at least one child process of the process.

19. The computer readable storage media of claim 16, wherein the first application instance identifier is associated with an application instance of an open request.

20. The computer readable storage media of claim 16, wherein the first application instance identifier is associated with the process.

* * * * *